United States Patent
Healy

(10) Patent No.: US 7,549,804 B2
(45) Date of Patent: Jun. 23, 2009

(54) OPTICAL UNIT HAVING A TRANSMITTER INCLUDING A SEMICONDUCTOR SOURCE AND FIBER OPTIC ELEMENT AND METHOD OF MAKING SAME

(75) Inventor: David Healy, Stowmarket (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 140 days.

(21) Appl. No.: 11/153,545

(22) Filed: Jun. 16, 2005

(65) Prior Publication Data

US 2006/0285805 A1 Dec. 21, 2006

(51) Int. Cl.
*G02B 6/36* (2006.01)
*G02B 6/42* (2006.01)

(52) U.S. Cl. .............................. 385/92; 385/90; 385/93

(58) Field of Classification Search ........................ None
See application file for complete search history.

(56) References Cited

U.S. PATENT DOCUMENTS

| | | | | |
|---|---|---|---|---|
| 5,315,680 A | | 5/1994 | Musk et al. | |
| 5,347,604 A | * | 9/1994 | Go et al. | 385/92 |
| 5,416,869 A | * | 5/1995 | Yoshino | 385/88 |
| 5,978,535 A | * | 11/1999 | Mitsuda et al. | 385/88 |
| 6,540,413 B1 | * | 4/2003 | Althaus et al. | 385/92 |
| 6,798,575 B2 | * | 9/2004 | Kobayashi | 359/618 |
| 6,804,436 B2 | | 10/2004 | Healy | |
| 6,869,231 B2 | * | 3/2005 | Chiu et al. | 385/93 |
| 2006/0285805 A1 | * | 12/2006 | Healy | 385/92 |

* cited by examiner

*Primary Examiner*—Omar Rojas

(57) ABSTRACT

A housing for a device has first and second segments with opposed adjacent surfaces fixedly connected to each other. The first segment fixedly carries a semiconductor optical source for emitting a linearly polarized optical beam in the general direction of the longitudinal axis of the housing. The second segment fixedly carries an optical fiber element having an end face positioned along the longitudinal axis to intercept the optical beam and a linear optical polarizer. The first and second segments are fixedly positioned relative to each other along the longitudinal axis and in a plane perpendicular to the longitudinal axis so the optical beam, as incident on the end face, has a predetermined geometry and position. The second segment is fixedly positioned about the longitudinal axis so the optical beam, as incident on the end face, is in a predetermined power range.

10 Claims, 11 Drawing Sheets

OPTICAL UNIT HAVING A TRANSMITTER INCLUDING A SEMICONDUCTOR SOURCE AND FIBER OPTIC ELEMENT AND METHOD OF MAKING SAME

FIELD OF INVENTION

The present invention relates to an optical unit having a transmitter including a semiconductor optical source and a fiber optic structure and to a method of making same and more particularly to such a method and product wherein a polarizer is positioned in an optical path between the optical source and an input face of the fiber optic structure.

BACKGROUND ART

Optical devices, such as semiconductor laser transceiver units and light emitting diodes, often have an optical port for transmitting optical energy into fiber optic structures, for example as part of an optical communications system or an optical scanning system. The optical fiber has at its end a connector for enabling the fiber to be connected and disconnected from the port.

Semiconductor laser and light emitting diode transmitter units need to be eye-safe when the connector is not connected to the port. Many semiconductor optical emitters, particularly those of optical communications links, operate at near-infrared wavelengths, e.g., 1.3 µm and 1.5 µm, which present added risk because such wavelengths are invisible. Applicable eye-safety standards for infra-red laser diode transmitter units are the US Standard CDRH Class 1 and the European Standard IEC 825.

Current safety guidelines require the output power density from an optical port of an optical transmitter unit to be limited to a level which is eye-safe when no fiber optic is connected to the port. Optical coupling efficiencies from a laser semiconductor diode into an optical fiber are typically quite low, for example of the order of about 1% to 25%. Even if the amount of optical radiation transmitted by the fiber is eye-safe, the total amount of optical radiation emitted by the semiconductor laser or light emitting diode may far exceed the limit of eye-safety. It is therefore necessary either to block unwanted optical energy within the port, or to defocus stray optical energy emitted by the port when no optical source is connected to the port.

One attempted solution to this problem is disclosed in U.S. Pat. No. 5,315,680, which describes an optical port having a short length of optical fiber, called a "fiber stub." The stub is held securely in alignment with a laser diode concealed within an optical transmitter unit. Collimating optics focus the laser optical energy into a single-mode core of the fiber. The fiber stub is typically 5 mm to 6 mm long. Optical energy which is not coupled into the core enters the fiber optic cladding and is dissipated by multiple reflections and scattering within the core and the exterior surface of the cladding. Any laser radiation that exits the cladding is not collimated, and is essentially "defocused" to greatly reduce the inherent brightness of such stray radiation.

In recent years there has been an increasing demand for fiber optic communication links having a bandwidth in excess of 1 GHz, for example up to 10 GHz. One way a laser semiconductor diode can operate at higher data rates is to drive the laser at a higher power. It is possible to reduce the amount of optical power launched into a core of a fiber optic structure by defocusing a laser beam focused on an input end face of the fiber stub. Defocusing is achieved by axially offsetting the laser beam waist with respect to the input end face of the fiber optic core. Such an arrangement can also be used to reduce the amount of optical power in the core depending on product specifications and the requirements of various applications. Because the core diameter is much smaller than the cladding diameter more defocused optical energy is incident on the cladding. Thus, there is still more total laser power incident on both the core and the cladding of the fiber stub, to the point where optical energy propagating through the fiber core and/or stub is not eye-safe.

Another problem with using the defocus technique is that the amount of laser power incident on and propagating in the core becomes more sensitive to changes in the relative orientation along the light transmission direction of the fiber stub, the laser and any intervening collimating optics. Such orientations can change because of (1) thermal expansion of components forming the optical transmitter unit, and/or (2) ageing-induced creep of the materials and adhesives used in the construction of the unit.

One way to reduce the laser power propagating from the end of the fiber stub remote from the input end face is to increase the length of the stub. Increasing the stub length increases scattering and absorption over the length of the stub. Cladding modes within a length of optical fiber between about 100 mm and 200 mm long are substantially dissipated. Increasing the stub length undesirably increases the size of the optical transmitter module.

Another attempted solution is to incorporate, at the end of the stub, an aperture, e.g., an absorbing ring around the outside of the fiber core. The aperture, however, must be closely aligned with the core, having a diameter of the order of about 10 µm. This results in additional process steps, which add cost and complexity to the optical transmitter unit.

Commonly assigned Healy (U.S. Pat. No. 6,804,436) discloses an eye-safe optical transmitter unit comprising a laser semiconductor diode for emitting optical radiation. An optical fiber stub having a fiber core carries the optical radiation and is surrounded by a cladding. The core is an index-guided core.

The optical fiber stub is disposed in a ferrule. The ferrule is rotatable in a manner which alters the orientation angle of the entrance face with respect to the beam axis, thereby affecting the efficiency of coupling of the optical radiation into the fiber core and cladding.

Focusing optics focus the optical radiation from the laser semiconductor diode on an entrance face of the fiber stub. The focusing optics focuses the optical radiation along the beam axis to a focus spot on the entrance face of the fiber stub. The entrance face is tilted at a particular orientation with respect to the beam axis.

The focusing optics focus the optical radiation along the focus axis to a focus spot on the entrance face of the fiber stub to increase the coupling efficiency of optical radiation from the radiation source to the entrance face of the fiber core and to decrease the coupling efficiency of optical radiation to the input face of the surrounding cladding. The coupling efficiency into the core is a maximum at a particular orientation of the entrance face with respect to the focus axis when the focus spot is on the entrance face. The entrance face is not oriented at the particular orientation, but is angled and/or rotated away from the particular orientation to reduce the coupling efficiency of the optical radiation from the source to the fiber core and fiber cladding. In one embodiment a polarizer is fixedly attached to the entrance face of the fiber stub at the time the fiber stub is fixedly positioned relative to the optical source.

While the apparatus disclosed in the Healy patent functions admirably for certain circumstances, it is somewhat complex, difficult to assemble, expensive and not applicable to certain situations.

The prior art Healy arrangement has problems if the distribution of light on the input end face of the fiber must be controlled for reasons other than power. For example, if the optical source launches an optical beam into a multi-mode fiber to provide excitation of specific mode groups, the excited modes depend on factors such as beam waist of the source, beam power and beam spatial distribution (i.e., one or more of spot size, spot shape, spot numerical aperture and spot location) on the input end face of the fiber and the alignment of the fiber with respect to the beam axis. Adjusting the alignment of the fiber in all three directions, i.e., in the X, Y and Z directions (where X and Y are axes at right angles to each other in a plane at right angles to the beam axis and Z is the distance between the laser source and the fiber input end face along the beam axis) with respect to the optical source frequently has an undesirable effect on the excited modes in the fiber optic structure. Under certain conditions, it is necessary to launch the optical beam with the fiber at the beam waist. Hence, under these conditions, the prior art alignment technique is sometimes undesirable.

An object of the present invention is to provide a new and improved optical transmitter with a semiconductor optical source and a fiber optic structure and a method of making same, wherein several parameters of the optical radiation incident on end face of the optical fiber element are optically controlled; among the parameters are power and spot spatial distribution.

SUMMARY OF THE INVENTION

In accordance with one aspect of the invention, a device comprises a housing having a longitudinal axis (z) and a pair of axes (x, y) at right angles to each other in a plane perpendicular to the z axis. The housing includes first and second segments having opposed adjacent surfaces that are fixedly connected to each other. The first segment fixedly carries a semiconductor optical source for emitting a linearly polarized optical beam in the general direction of the z axis. The second segment fixedly carries (a) an optical fiber element having an end face positioned along the z axis to intercept the optical beam and (b) a linear optical polarizer positioned between the optical source and the end face. The first and second segments are fixedly positioned relative to each other along the x, y and z axes for causing the optical beam, as incident on the end face, to have a predetermined geometry and position. The second segment is fixedly positioned about the z axis for causing the optical beam, as incident on the end face, to be in a predetermined power range.

The first segment preferably includes an optical element, e.g., a lens that is fixedly connected to the first segment and is positioned to intercept the optical beam. The first and second segments are positioned relative to each other along the directions of the x, y and z axes so the optical element can focus the beam on the end face with a predetermined numerical aperture and assist in causing the beam to have the predetermined desired geometry and position. The lens has a center that can be coincident with or displaced from the beam axis.

The geometry of the beam incident on the end face preferably includes spot size and spot shape to enable the device to be used with fiber optic elements that operate in different modes. The end face of the fiber element can be either perpendicular to or tilted with respect to the z axis. If the end face is not perpendicular, the angle of the end face with respect to the axis of the beam (as incident on the end face) affects the size, shape, position and numerical aperture of the beam spot incident on the end face.

A preferred method of making the device includes moving the first and second segments with respect to each other in the directions of the x and y axes. The first and second segments are translated with respect to each other in the direction of the z axis. The moving and translating steps are performed iteratively until the optical beam, as incident on the end face, has the predetermined geometry and position. The first segment and at least a portion of the second segment including the polarizer are turned with respect to each other until the power density incident on the end face is in the predetermined range. Thereafter, the first and second segments and the parts thereof are fixedly positioned relative to each other. Prior to the moving, translating and turning steps, the optical source is fixedly connected to the first segment and the optical fiber element and the polarizer are fixedly connected to the second segment.

In one embodiment, the opposed adjacent surfaces of the first and second segments include end faces of the first and second segments that are in planes perpendicular to the z axis. This embodiment is preferably such that the second segment includes a collar and a receptacle carrying the fiber optic element. The collar includes the end face of the second segment. The collar and receptacle have opposed cylindrical surfaces that are fixedly connected to each other.

A preferred method of making this embodiment comprises moving the end faces of the collar and first segment with respect to each other in the directions of the x and y axes. The opposing cylindrical surfaces of the collar and the receptacle are translated with respect to each other in the direction of the z axis without translating the collar with respect to the first segment in the direction of the z axis. The moving and translating steps are performed iteratively until the optical beam, as incident on the end face, has the predetermined geometry and position. At least the portion of the second segment including the polarizer is turned with respect to the collar while the collar remains stationary until the power density of the beam incident on the end face is in the predetermined range. Thereafter, the opposed end faces of the collar and first segment and the opposed cylindrical surfaces of the collar and receptacles are fixedly connected. Prior to all the moving, translating and turning steps, the optical source is fixedly connected to the first segment and the optical fiber element and polarizer are fixedly connected to the second segment.

In another embodiment, the first segment includes a V groove extending in the direction of the z axis, and the second segment has a cylindrical outer surface fixedly mounted in the V groove. This embodiment is preferably made by moving the cylindrical outer surface of the second segment in the V groove in the directions of the x and y axes and translating the cylindrical outer surface of the second segment in the V groove in the direction of z axis. The moving and translating steps are performed iteratively until the optical beam, as incident on the end face of the fiber optic element, has a predetermined geometry and position. The cylindrical surface of the second segment is turned about the longitudinal axis of the V groove until the power incident on the end face is in the determined range. Thereafter, the outer cylindrical surface of the second segment is fixedly connected to the V groove. Prior to all of the moving, translating and turning steps, the optical source is fixedly connected to the first segment and the optical fiber element and polarizer are fixedly connected to the second segment.

In a further embodiment, the first and second segments include opposed fixedly connected cylindrical surfaces. The adjacent surfaces include the opposed cylindrical surfaces.

This embodiment is preferably made by moving the cylindrical surfaces of the first and second segments relative to each other in the directions of the x and y axes. The cylindrical surfaces of the first and second segments are translated relative to each other in the direction of the z axis. The moving and translating steps are performed iteratively until the optical beam, as incident on the end face, has the predetermined geometry and position. The cylindrical surfaces of the first and second segments are turned relative to each other until the power incident on the end face is in the predetermined range. Thereafter, the opposed cylindrical surfaces are fixedly connected to each other. Prior to all of the moving, translating and turning steps, the optical source is fixedly connected to the first segment and the optical fiber element and polarizer are fixedly connected to the second segment.

In a further embodiment, the first segment has an exterior shape that is a right parallelepiped.

The source can be a laser for emitting the linearly polarized beam or the source can include a semiconductor for emitting a weakly polarized or non-polarized beam, in which case the source includes a second linear polarizer for linearly polarizing the weakly or non-polarized beam.

The first mentioned polarizer can be mounted on the end face of the optical fiber element or the second segment can include a holder for the optical fiber element, in which case the first mentioned polarizer is fixedly mounted on the holder.

Another aspect of the invention relates to a method of assembling an optical transmitter having (a) a first segment including a semiconductor optical source for emitting a linearly polarized optical beam, and (b) a second segment including a fiber optic element having an input end face and a polarizer. Prior to the beginning the method of assembly, the optical source is fixedly connected to the first segment and the fiber optic element and the polarizer are fixedly connected to the second segment. The first and second segments are joined to form a housing having a longitudinal axis. The first and second segments are joined so the beam adapted to be emitted by the source is adapted to propagate at least in the general direction of the longitudinal axis and to be incident on an input end face of the fiber optic element after passing through the polarizer. The joined first and second segments are translated relative to each other in a plane at right angles to the longitudinal axis and in the direction of the longitudinal axis so the beam, as incident on the input end face, has a predetermined desired spot size, shape, and location. The first and second segments are turned relative to each other about the longitudinal axis so the power density of the beam incident on the end face is in a predetermined desired range. The first and second segments are permanently connected to each other at the relative locations thereof that resulted in the beam, as incident on the input end face, having the predetermined desired spot size, shape, location, and power density.

In one embodiment, the first segment includes an optical element, e.g. a lens, that (a) is adapted to affect the numerical aperture of the beam, as incident on the input end face, and (b) is fixedly connected to the first segment. The translating step, in such an instance includes translating the first and second segments in the plane at right angles to the longitudinal axis and along the longitudinal axis so the numerical aperture has a predetermined desired value.

The above and still further objects, features and advantages of the present invention will become apparent upon consideration of the following detailed description of specific embodiments thereof, especially when taken in conjunction with the accompanying drawings.

DETAILED DESCRIPTION OF THE DRAWINGS

Figure 1:
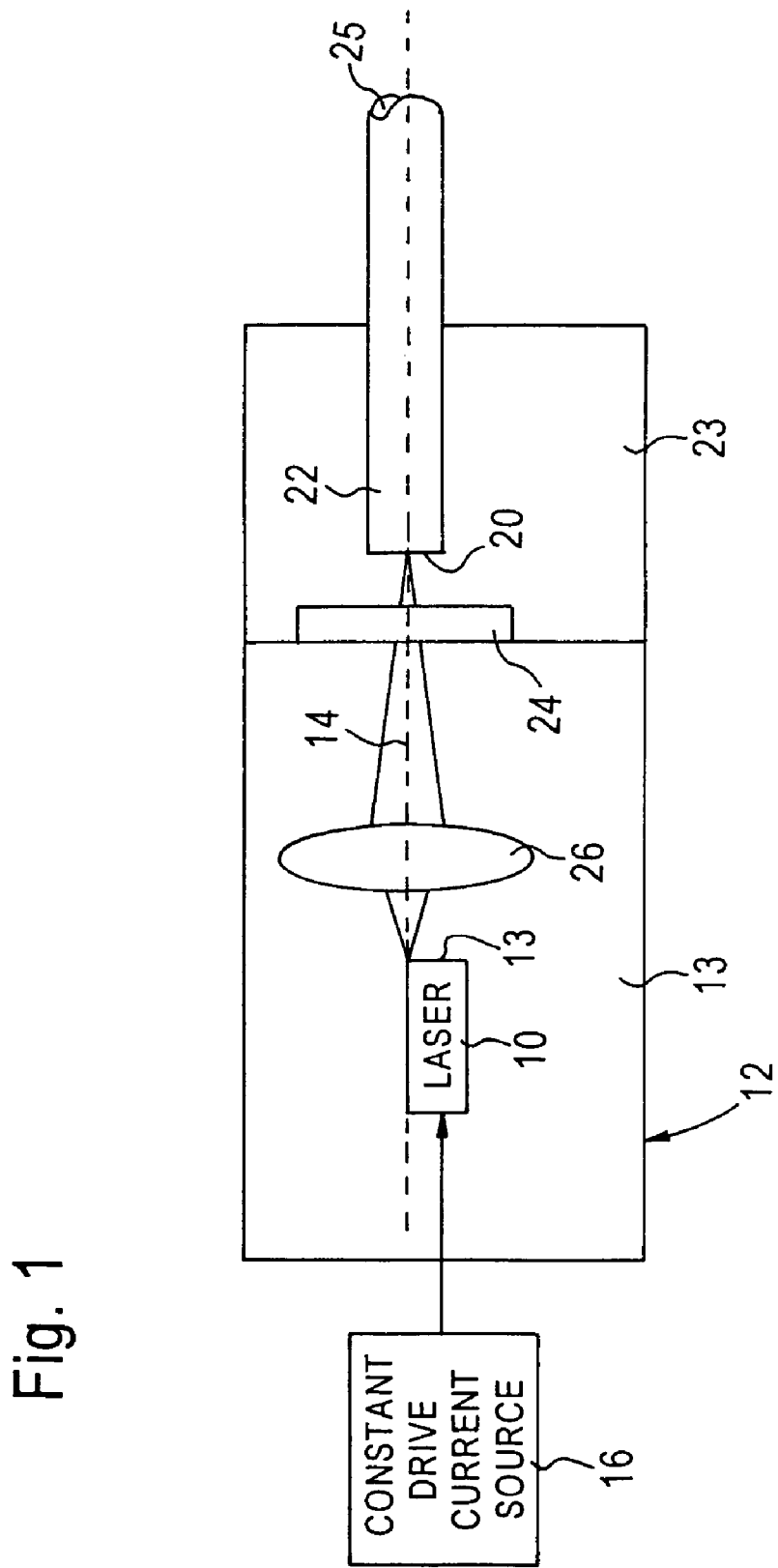
FIG. 1 is a schematic, block diagram of a preferred embodiment of the present invention.

Reference is now made to FIG. 1 of the drawing, wherein edge emitting semiconductor diode laser 10 is fixedly located in a first segment 11 of optically opaque housing 12. Laser 10 has an end face 13 that typically emits a coherent linearly polarized optical beam having a wavelength in the near infrared region, for example, 1.3 or 1.5 μm. The beam emitted by laser 10 has an optical axis that is coincident with or close to the longitudinal axis 14 of housing 12. The beam is linearly polarized at a predetermined angle, determined by the optical parameters of laser 10 and the angular position of laser 10 relative to the beam axis. The beam emitted by laser 10 has a constant intensity by virtue of the laser being supplied with a current having a constant amplitude and carrier frequency as derived by constant drive current source 16. Laser 10 is a connectorized or pigtailed assembly of a type well known to those skilled in the art.

The beam emitted by laser source 10 is incident on input end face 20 of the core of single or multi-mode micrometer fiber optic element 22 fixedly mounted in a second segment 23 of housing 12. Linear polarizer 24, positioned on the axis 14 between end faces 13 and 20, is fixedly located in segment 23, by virtue of the polarizer being fixedly carried by segment 23 or end face 20. Polarizer 24 is turned so the polarization direction thereof is at the correct angle to achieve eye protection for a viewer at output end 25 of fiber optic element 22, consistent with maximum optical power at output end 25.

Prior to the beginning of the operations associated with joining segments 11 and 23 to each other, laser 10 and lens 26 are permanently fixedly connected to segment 11, while optical fiber element 22 and linear polarizer 24 are permanently fixedly connected to segment 23. During the operations associated with joining segments 11 and 23, the segments are translated relative to each other longitudinally of axis 14, i.e., in direction of the z axis, and in two directions at right angles to each other in a plane transverse to the direction of the z axis, i.e., in the directions of x and y axes, until the spot incident on end face 20 has the desired spatial distribution. The desired spatial distribution is determined by the spot geometry (i.e., spot size and shape), spot location and spot numerical aperture. After the desired spatial distribution has been achieved, usually by iterative positioning of segments 11 and 23 with respect to the x, y and z axes, segments 11 and 23 are turned with respect to each other about the z axis to obtain the desired power density at the end 25 of the optical fiber element 22 remote from input end face 20. Usually iterative translation and turning of segments 11 and 23 is necessary to obtain the desired spot size, spot shape, spot position and power density. After the desired spot size, spot shape, spot position and power density are attained, segments 11 and 23 are permanently connected together.

In the embodiments of FIGS. 1-6, the opposing surfaces are planar faces of the first and second segments in planes at right angles to the z axis. The planar surfaces are translated relative to each other to obtain the desired beam spot shape on the core end face 20. The second segment includes a pair of opposed cylindrical surfaces that are translated relative to each other in the z axis direction to control spot size and shape on the core of end face 20. The opposed cylindrical surfaces are turned relative to each other about the z axis to control power density of the beam incident on end face 20.

Figure 7:
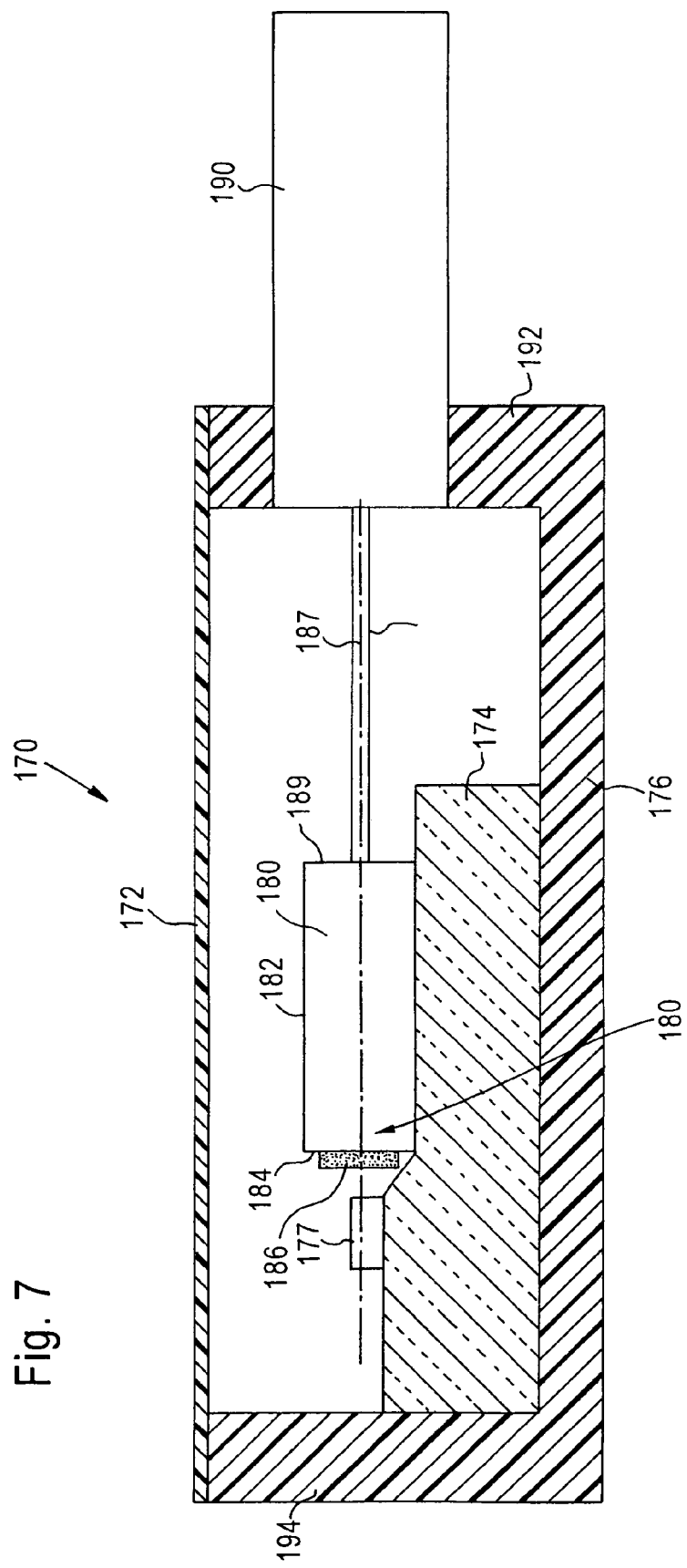
FIG. 7 is a side view of the interior of a TOSA, wherein a package includes (1) an optical bench carrying a laser, and (2) an assembly carrying an optical fiber and polarizer, wherein the assembly has a cylindrical outer surface that can be turned and translated in three axial directions relative to a longitudinally extending V groove on the bench.
Figure 8:
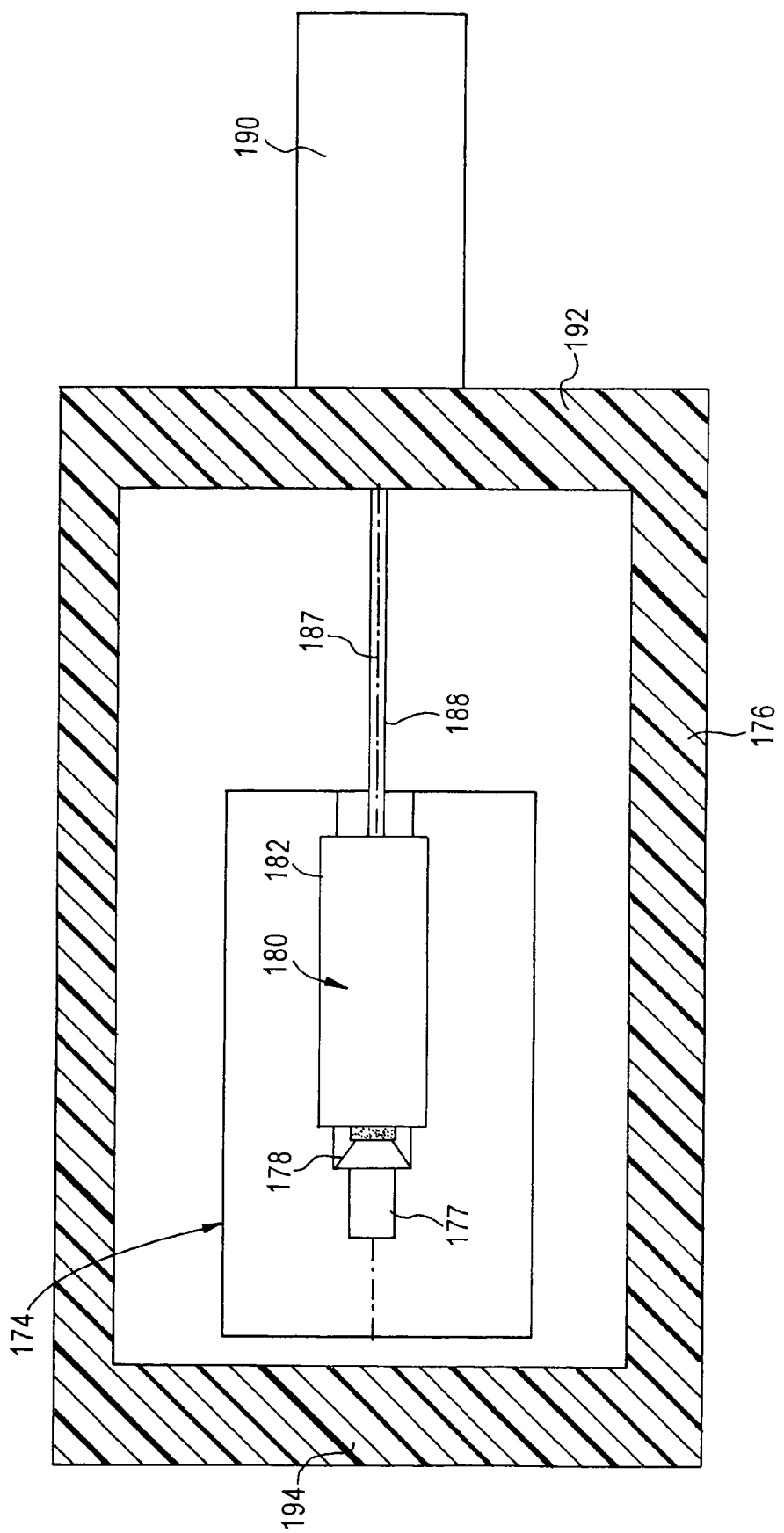
FIG. 8 is a top view of the structure illustrated in FIG. 7.
Figure 9:
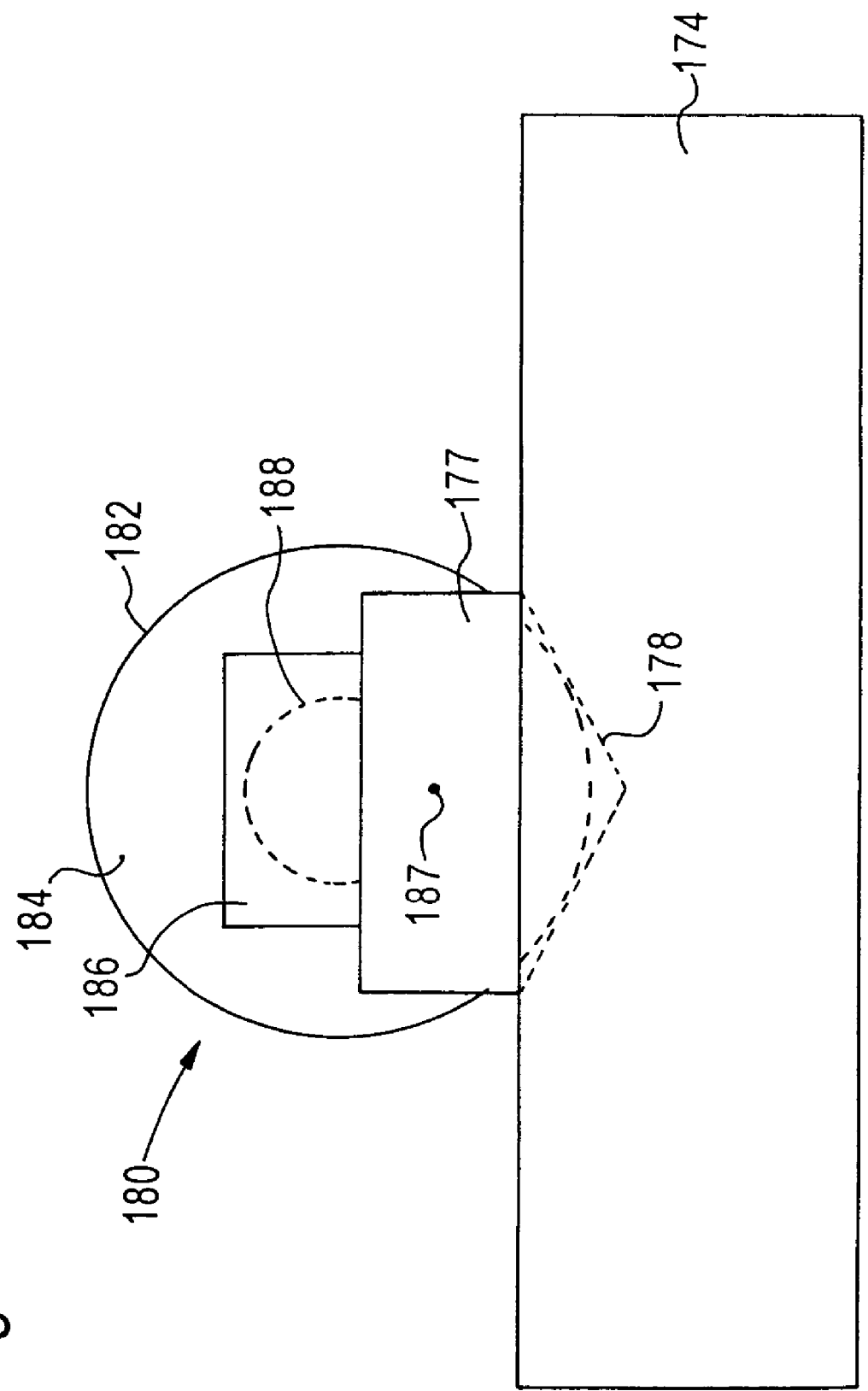
FIG. 9 is an end view of the structure illustrated in FIG. 8.

In the embodiment of FIGS. 7-9, one of the opposing surfaces is a cylindrical surface of the second segment that is (1) translated in the directions of the x, y and z axes relative to the longitudinal axis of a V groove of the first segment to achieve the desired spatial distribution, and (2) turned about the longitudinal axis to obtain the desired power density.

Figure 10:
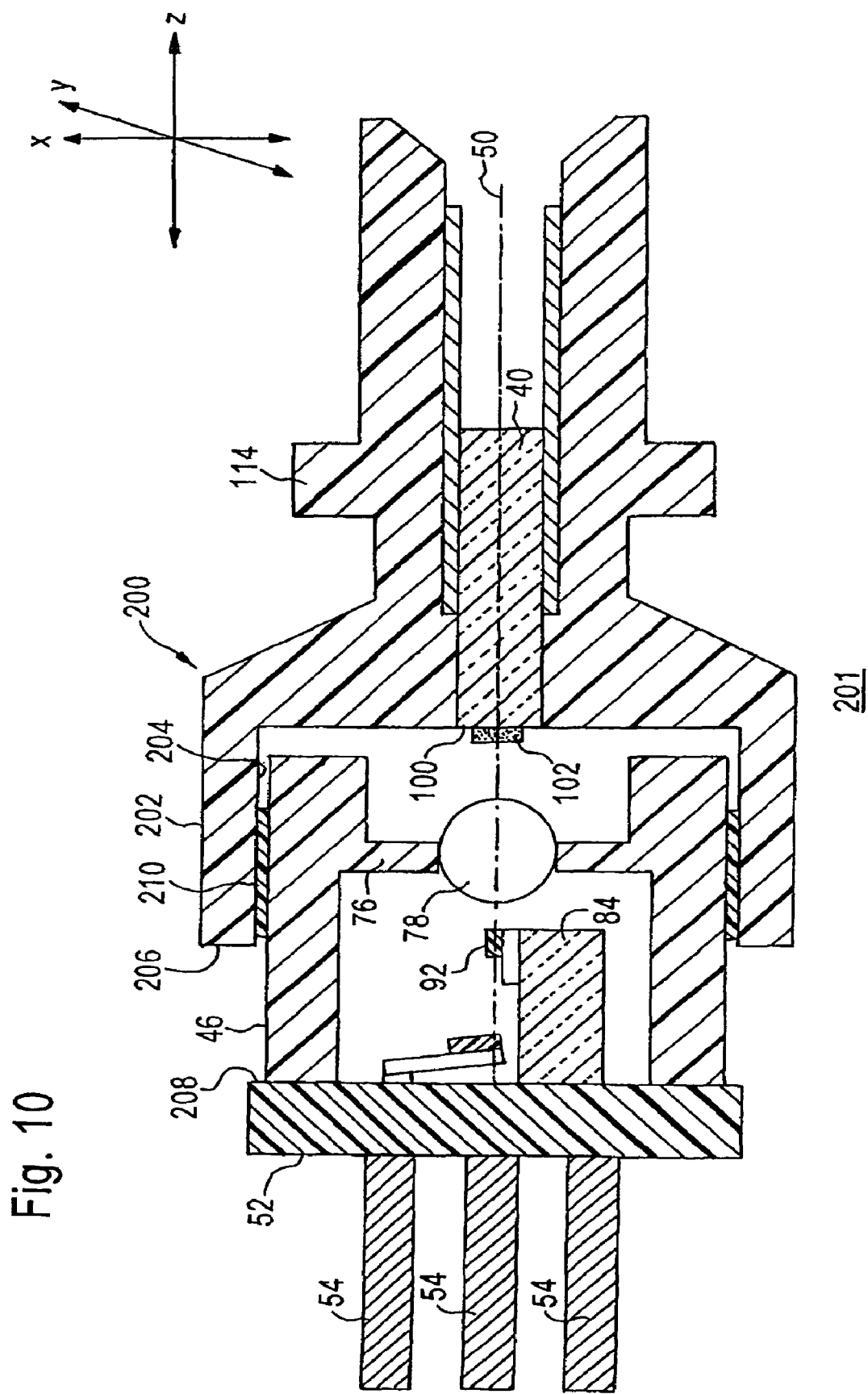
FIG. 10 is a side view of the interior of a TOSA including a body that interfits with a receptacle including a fixedly mounted fiber stub having a polarizer fixedly mounted on an end face thereof.

In the embodiment of FIG. 10, the opposing surfaces are cylindrical surfaces of the first and second segments that are (1) translated relative to each other in the directions of x, y and z axes to achieve the desired spatial distribution and (2) turned relative to each other about the z axis to achieve the desired power density.

Optical fiber element 22 can be a stub or a fiber optic transmission line and is of a type for efficiently transmitting, in a single mode or in multi-mode, the near infrared energy emitted by source 10. End face 20 is shown in its typical position, i.e., perpendicular to axis 14, but can be tilted with respect to the axis as described infra in connection with FIG. 11.

Fiber optic element 22 includes a core surrounded by a cladding, as is typical in the art. The beam is usually confined to be incident on the core and is usually not incident on the cladding.

A focusing element for the beam of laser 10 includes spherical lens 26 that is fixedly positioned in segment 13 between source 10 and polarizing element 24. The focusing element can also be aspherical, diffractives, or include a twin lens design. Focusing lens 26 that is employed in the embodiments of FIGS. 1-6, 10 and 11, but is not always necessary, focuses the optical beam emitted by source 10 on end face 20. Lens 26 enables the beam incident on end face 20 to have a desired numerical aperture and affects other parameters (e.g., spot geometry, spot location and spatial phase) of the beam incident on end face 20.

Because control of the power of the optical energy incident on end face 20 is completely independent of (1) the alignment of the end face with respect to laser 10 and (2) the properties of the radiation emitted by laser 10 (such as beam waist and intensity profiles) the optical modes excited within the fiber optic element 22 can be controlled separately to achieve the desired result. Adjustment of the power of the optical energy incident on end face 20 is also independent of the method used to excite laser 10, thereby enabling constant current source 16 to be used. By employing constant current source 16 to excite laser 10, the bandwidth of the energy emitted by the laser source is maintained constant.

Figure 2:
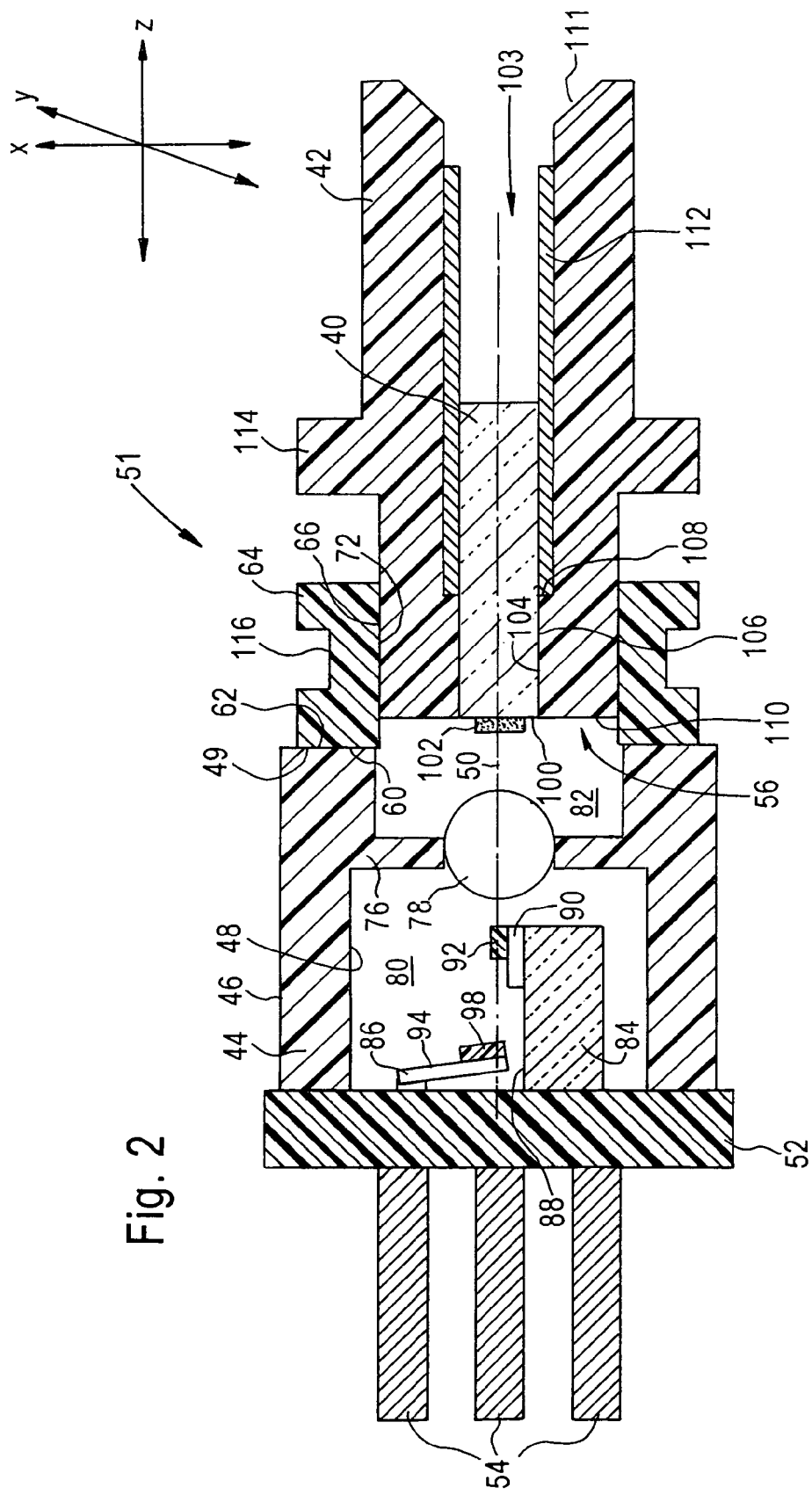
FIG. 2 is a side view of the interior of a transistor outline (TO) based transmitter optical subassembly (TOSA) in accordance with a first preferred embodiment of the present invention; wherein a polarizer is fixedly attached to an input end face of a fiber stub that is fixedly attached to a receptacle assembly for the stub.

Reference is now made to FIG. 2 of the drawing, a side view of the interior of a transistor outline (TO) based transmitter optical subassembly (TOSA) with an optical fiber stub 40 inserted into receptacle assembly 42 that can be considered part of second segment 23, FIG. 1. TO body 44 (that can be considered as corresponding to first segment 11 of FIG. 1) has cylindrical outer and inner walls 46 and 48, respectively, concentric with the common central axis 50 of the body and of housing 51 (corresponding to housing 10, FIG. 1). A first planar end 49 of body 44 is fixedly attached to disc shaped electrically insulating base 52 through which extend suitable metal leads 54 to components within body 44. A second end 56 of body 44 remote from first end 49 includes a planar end face 60 that is opposed to and bonded to a planar end face 62 of collar 64 that can be considered another part of second segment 23, FIG. 1. Collar 64 has a smooth internal cylindrical surface 66 that is opposed to and bonded to the smooth exterior cylindrical surface 70 of receptacle assembly 42.

Body 44 includes inwardly extending annular flange 76 having a diameter slightly greater than the diameter of spherical focusing lens 78 which is fitted into the circular opening of flange 76 that has an axis coincident with or close to axis 50. Lens 78 is bonded to the interior edge of flange 76 so that the diameter of the lens is coincident with or slightly removed from axis 50.

Flange 76 and lens 78 (which can be other than spherical as mentioned supra in connection with lens 26, FIG. 1) divide the interior of body 44 into first and second cavities 80 and 82. One end of cavity 80 is bounded by an end face of base 52 that carries optical bench 84 and support 86. Upper surface 88 of optical bench 84 carries a small printed circuit board 90, on which is fixedly mounted semiconductor laser 92 that emits a linearly polarized coherent optical beam having an axis that extends generally in the same direction as axis 50 so it may or may not be coincident with axis 50. Support 86 carries printed circuit board 94, on which is mounted semiconductor photodiode 98 that is positioned to be responsive to optical energy at the wave length of laser 92 and propagated into cavity 82 via lens 78. The printed circuit board 90 on optical bench 84 is connected via leads 54 to a suitable electronic source 16 (shown in FIG. 1) for activating the laser 92 with a constant current modulation. The optical energy detected by photodiode 98 is coupled from the photodiode to another one of leads 54 via circuitry included on the printed circuit board 94.

Optical fiber stub 40, that is fixedly mounted in receptacle assembly 42, has a planar input end face 100 remote from the spherical lens. End face 100 is in a plane perpendicular to axis 50 and positioned so the optical beam emitted by laser 92 and focused by lens 78 is incident on it. The end face 100 of optical fiber stub 40 fixedly carries a linear polarizer plate 102. Receptacle assembly 42, and therefore polarizer plate 102, is turned relative to collar 64 about axis 50 so the power density of the optical energy from laser 92 that passes through polarizer 102 and is incident on end face 100 has a desired value for eye safety and maximum propagation distance through optical stub 40 and a fiber optic transmission line (not shown) optically coupled to the end face of stub 40 opposite from face 100.

Receptacle 42 includes a cylindrical passage 103 into which fiber stub 40 is fitted and fixedly connected. Optical fiber stub 40 has a cylindrical exterior wall 104 having a diameter less than the diameter of the interior cylindrical wall 106 of the passage 103 of receptacle assembly 42 in the vicinity of stub 40. The passage 103 of receptacle assembly 42 includes a shoulder 108 such that the passage 103 has a smaller diameter between the shoulder 108 and the planar end face 110 of receptacle assembly 42 than the portion of the passage between the shoulder and the end 111 of the passage remote from end face 110. Such an arrangement facilitates insertion of optical fiber stub 40 into the passage 103. The optical fiber stub 40 is fixedly connected to and held in place by a split sleeve 112, that extends between shoulder 106 and end 111 of receptacle assembly 42, and has an inner diameter that is slightly larger than the outer diameter of the optical fiber stub. The split sleeve 112 has an outer diameter that is slightly less than the diameter of the portion of passage 103 between shoulder 106 and end 111 of receptacle assembly.

Prior to connecting the first segment (including laser 10 and body 44) of housing 51 to the second segment (including receptacle assembly 42 and collar 64), all parts of the first segment are fixedly and permanently connected to each other and all parts of receptacle assembly 42 are fixedly and permanently connected to each other, so that, e.g., lens 78 and laser 92 are fixedly and permanently connected to TO body 44 and fiber stub 40, polarizer 102 and split sleeve 112 are fixedly and permanently connected to assembly 42.

During manufacture, a fixture (not shown) holds body 44, receptacle assembly 42, and collar 64 at the positions generally shown in FIG. 2. The position of the optical beam from laser 92 on the end face 102 of optical fiber stub 40 is controlled by translating end face 60 of body 44 with respect to end face 62 of collar 64 (therefore with respect to receptacle assembly 42) in the directions of x and y axes of housing 51, i.e., in directions at right angles to each other in a plane perpendicular to axis 50. Movement of body 44 and/or collar 62 in the x and y directions is performed until the spot on the end face 100 of the optical fiber stub 40 has the correct, desired geometry (i.e., size and shape) and the center of the beam incident on the end face is correctly positioned on the core of the end face. The center of the beam incident on the optical fiber stub end face 100 is not necessarily coincident with the center of the end face. The desired shape of the spot depends on the mode to be transmitted in optical fiber stub 40. The correct, desired shape is typically circular, annular or elliptical, depending on the propagation mode of the optical energy in the fiber optic stub and optical waveguide coupled to the sub.

After the correct spot shape and position have been achieved by positioning end face 60 of body 44 in the x and y directions relative to end face 62 of collar 64, the position of the end face 100 of optical fiber stub 40 relative to the emitting face of laser 92 is effectively adjusted in the z axis direction, i.e., in a longitudinal direction with respect to axis 50. Axial control of the end face 100 of optical fiber 40 in the z direction is performed by sliding cylindrical surface 72 of receptacle assembly 42 in the direction of the z axis, i.e., along axis 50, relative to cylindrical surface 66 of collar 64. Assembly 42 is longitudinally translated relative to collar 64 until the beam incident on end face 100 has the correct, desired size.

The size of the spot incident on end face 100 is influenced by the alignment of the lens 78 in the directions of the x, y and z axes with respect to the optical beam axis. Adjusting the lens alignment with respect to the beam axis changes the magnification of the lens system and therefore the spot size. In addition, adjusting the alignment of lens 78 with respect to the optical beam axis can control the spot shape if the lens diameter is offset from the beam axis. In certain instances, it is desirable to change the numerical aperture of the optical system between the laser and the end face of optical fiber stub 40, a result which can be achieved by changing the alignment of the lens 78 or by changing the design of the lens, such as by introducing specially designed optical elements, such as a defractive. Displacing the center of lens 78 so the lens center is not aligned with the beam axis can also affect the position, shape and spatial phase of the optical energy incident on the end face of stub 40.

After the beam incident on end face 100 has been determined to have the desired size (the z axis parameter), it is necessary to determine if the beam still has the desired shape and position (the x and y axis parameters). If the x and y parameters are not satisfied, it is necessary to again move the planar end faces 60 and 62 relative to each other in the x and y directions. The process is performed iteratively until the correct x, y and z criteria have been satisfied.

After the x, y and z parameters have been satisfied, the power incident on the planar end face of optical fiber stub 40 is controlled by effectively turning the polarizer 102 on the end face 100. The polarizer 102 is turned so the linear polarization thereof and the linear beam polarization cause the power density incident on end face 100 to be in the desired range. To this end polarizer, 102 is turned by turning receptacle assembly 42 with respect to body 44 about axis 50, without materially affecting the x, y and z positions of the planar end face 100 of stub 40. However, because there is a high probability of the x, y and z positions of the end face 100 of stub 40 being changed as a result of turning of the receptacle 42, the x, y and z parameters must again be checked and varied, if necessary. After determining that the beam spot incident on end face 100 has the correct size, shape, location and power density, opposed surfaces 60 and 62 are fixedly and permanently connected to each other, as are opposed surfaces 66 and 72; the connection is typically by gluing, welding, soldering or fusing. The determinations of correct spot size, shape, location and power density are performed with the aid of optical detectors (not shown) responsive to optical energy emitted from the end face of optical fiber stub 40 opposite from the end face 100 which carries the polarizer 102.

Translating and turning of receptacle assembly 40 relative to collar 64 is facilitated by the fixture grasping the circular flange 114 that extends outwardly from the outer cylindrical surface of the receptacle assembly 42. As assembly 40 is moved relative to collar 64, the fixture grips annular notch 116 of collar 64.

Figure 3:
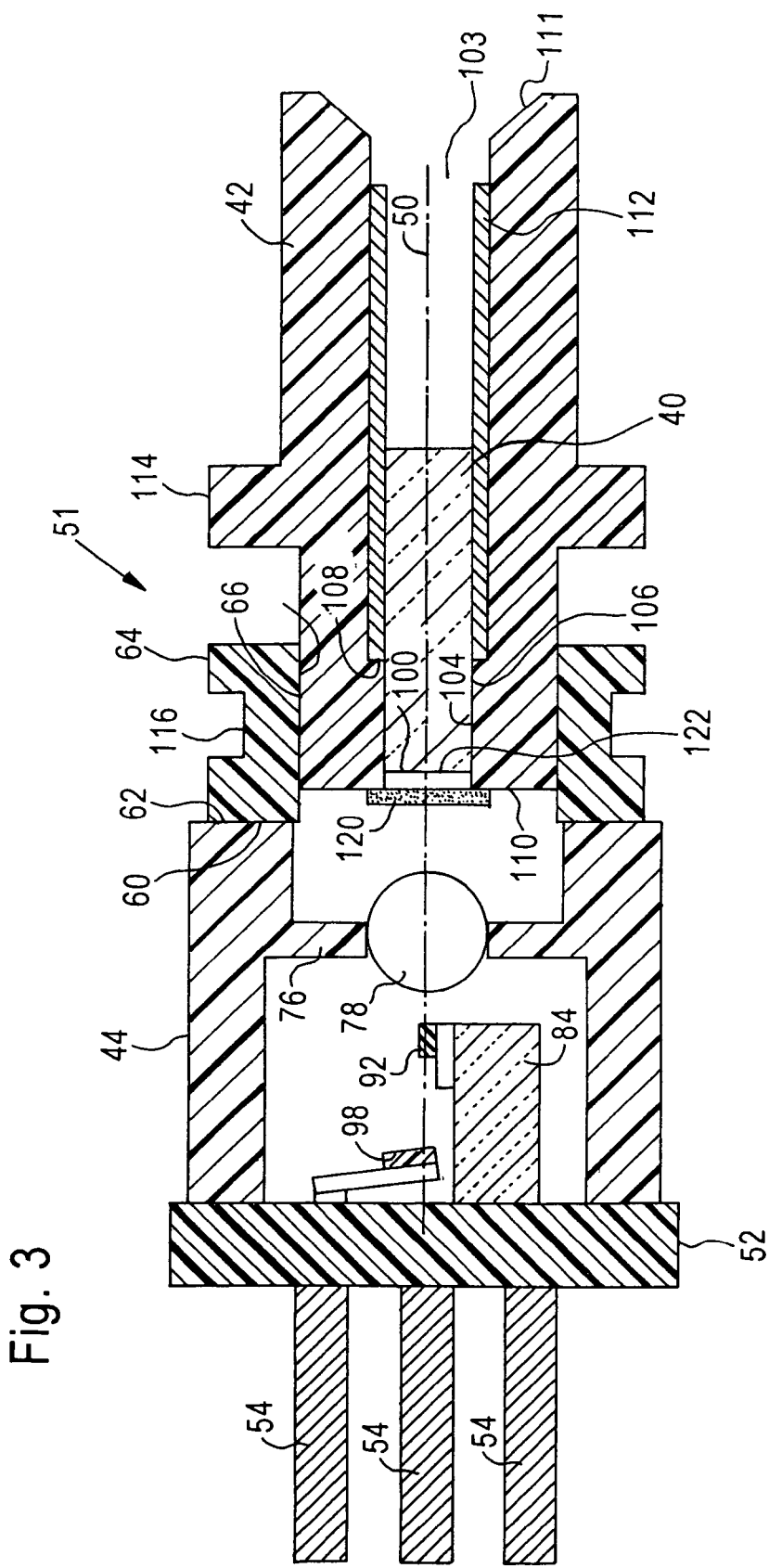
FIG. 3 is a side view of the interior of a TO based TOSA in accordance with a second preferred embodiment of the present invention; wherein a polarizer is fixedly attached to a receptacle assembly for a fiber optic cable and spaced by an air gap from an input end face of a fiber stub.

Reference is now made to FIG. 3 of the drawing, an illustration of a TOSA that is the same as the TOSA of FIG. 2, except that the TOSA of FIG. 3 replaces the polarizer 102 on the end face 100 of the optical fiber stub 40 with a larger polarizer 120 fixedly mounted to the end face 110 of receptacle assembly 42. A further difference between the embodiments of FIG. 2 and FIG. 3 is that in FIG. 3 the end face 100 of the fiber optic stub 40 is translated away from the end face 110 of receptacle assembly 42 to provide an air gap 122 between the polarizer 120 and the end face 110 of the optical fiber stub 40. The x, y and z parameters of the TOSA of FIG. 3 are controlled as described supra in connection with FIG. 2. The density of the power incident on the end face of fiber stub 40 in FIG. 3 is controlled by turning receptacle assembly 42 about axis 50 until a desired output power density is achieved, as indicated by a monitor of the power density of the beam emitted by laser 92 incident on the end face of the fiber stub. After the desired x, y and z parameters, as well as the desired power density incident on the end face of fiber stub 40, have been achieved, the parts of the structure illustrated in FIG. 3 are permanently fixedly connected to each other.

Figure 4:
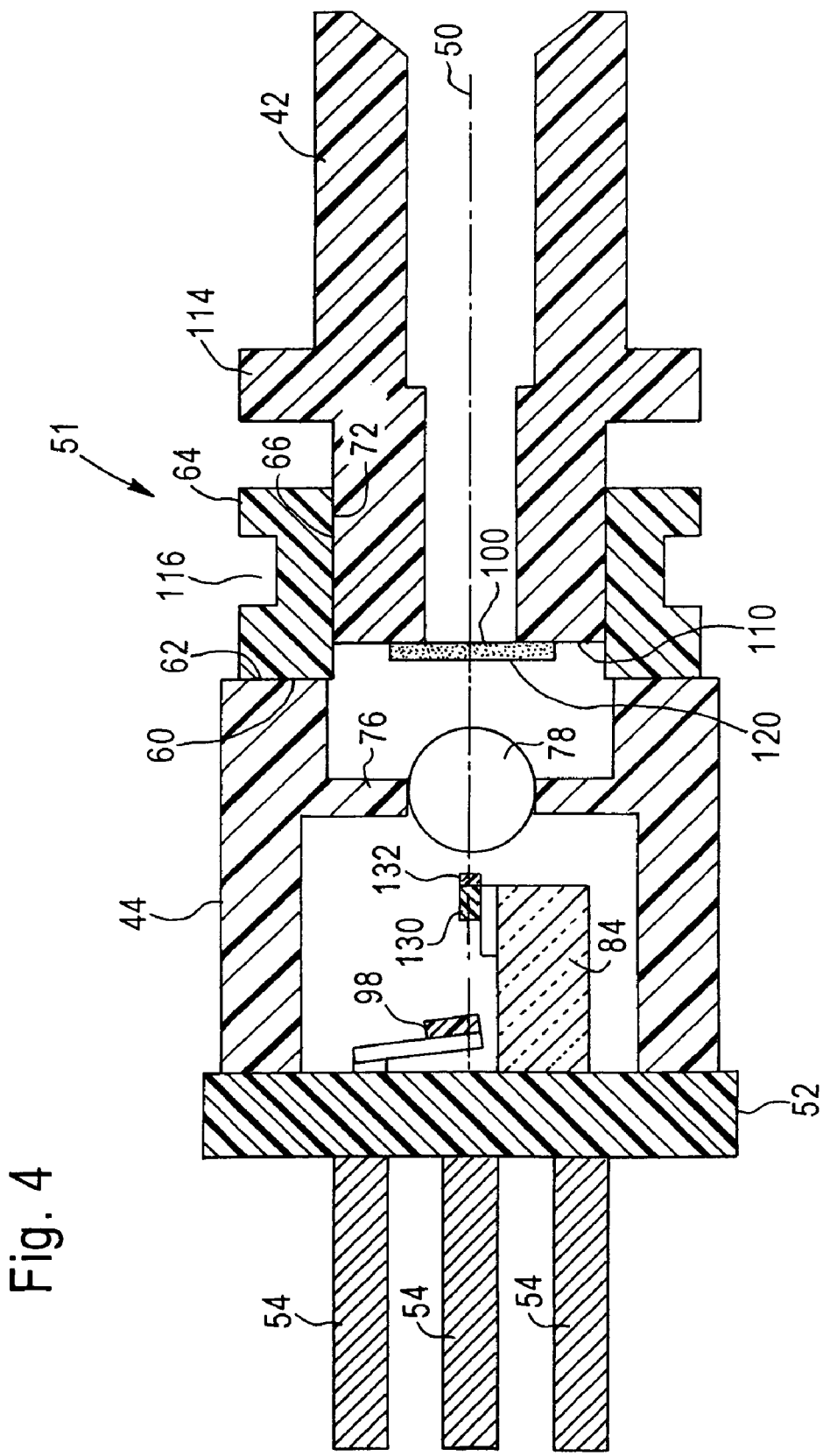
FIG. 4 is a side view of the interior of a TO based TOSA in accordance with a third preferred embodiment of the present invention; wherein a polarizer is fixedly attached to a receptacle assembly for a fiber optic cable.

Reference is now made to FIG. 4 of the drawing, an illustration of a modification of the structure illustrated in FIG. 3. In FIG. 4, the fiber stub 40 and the split sleeve 112 of FIGS. 2 and 3 are eliminated. A fiber optic patch cord (not shown) is inserted into receptacle assembly 42 such that the planar end face of the patch cord abuts the planar face of the polarizer 120 that is bonded to the end face 110 of receptacle assembly 42. Alternatively, the end face of the patch cord can be remote from the polarizer face, to provide an air gap similar to the air gap illustrated in FIG. 3. Control of the x, y and z parameters, as well as the power density incident on the end face of the patch cord are attained in the same manner as described in connection with the embodiments of FIGS. 2 and 3. After the desired spot size, spot shape and spot position parameters and power density level have been achieved, the parts are bonded to each other.

Another difference between the embodiment of FIG. 4 relative to the embodiments of FIGS. 2 and 3 is that in FIG. 4 the semiconductor laser 92 of FIGS. 2 and 3 that emits a strongly linearly polarized beam is replaced with a semiconductor diode 130 in the form of a laser that emits a weakly polarized beam or a light emitting diode. In such an instance, the semiconductor diode 130 includes linear polarizer 132 on its output window so the beam emitted by diode 130 is intercepted by linear polarizer 132 and becomes strongly linearly polarized. Thereby polarizer 120 of FIG. 4 acts on the beam emitted by diode 130 in the same manner as described supra in connection with laser 92 and polarizers 100 and 120 of FIGS. 2 and 3.

Figure 5:
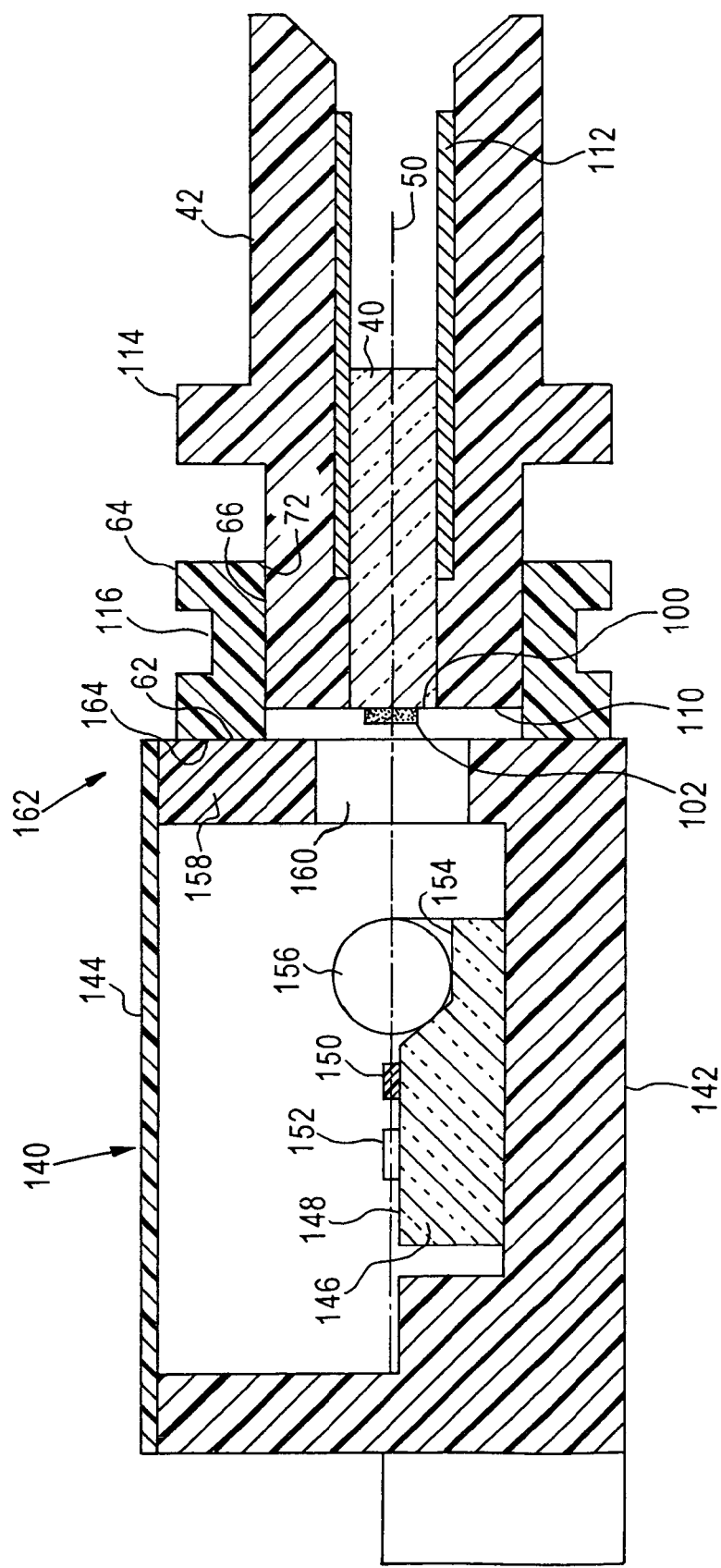
FIG. 5 is a side view of the interior of a planar TOSA with a polarizer fixedly attached to an end face of a fiber stub that is fixedly attached to a receptacle assembly for the stub.

Reference is now made to FIG. 5 of the drawing wherein the receptacle assembly 42, collar 64, polarizer 102 and the components associated therewith are constructed the same as in FIG. 2. In FIG. 5, the cylindrical TO body of FIGS. 2-4 is replaced with a planar TOSA package 140 that corresponds with segment 13, FIG. 1. Package 140 has the shape of a right parallelepiped having a flat base 142 and flat ceiling 144, that are parallel to each other. The flat base 142 of the planar TOSA package 140 carries an optical bench 146 having a planar upper surface 148 parallel to the base 142 and ceiling 144. Bench 146 carries a semiconductor laser 150 and a printed circuit board 152 connected to supply energizing power to the semiconductor laser. A portion of the optical bench along the beam axis of the laser includes a cutout 154 in which the focusing element 156 (that can have any of the configurations previously mentioned in connection with element 26, FIG. 1) is fixedly mounted. The planar TOSA package 140 includes a wall 158 at right angles to the base 142 and ceiling 144 of the TOSA package; the wall includes an opening 160 through which the beam from the laser 150 passes, after the beam has been focused by the focusing element 156 on the input face 100 of stub 40.

In the embodiment of FIG. 5, the planar TOSA package is moved in the x and y directions, i.e., directions at right angles to each other in a plane at right angles to the longitudinal (z) axis of the housing 162 that includes package 140, receptacle assembly 42 and collar 64. Hence, package 140 is translated in the directions of the x, y and z axes of housing 162 relative to the collar 64 and receptacle assembly 42 to control spot size, spot shape, spot location and numerical aperture. Then the receptacle assembly 42 is turned with respect to the collar 64, to in turn rotate the linear polarization direction of polarizer 102 relative to the linear polarization angle of the beam emitted by semiconductor laser 150 to cause the desired power density to be incident on the end face 100 of the optical fiber stub 40. Then the opposing planar end faces 62 and 164 of collar 64 and wall 158 are permanently fixedly connected to each other and the opposing cylindrical surfaces 66 and 72 of collar 64 and assembly 42 are permanently fixedly connected to each other.

Figure 6:
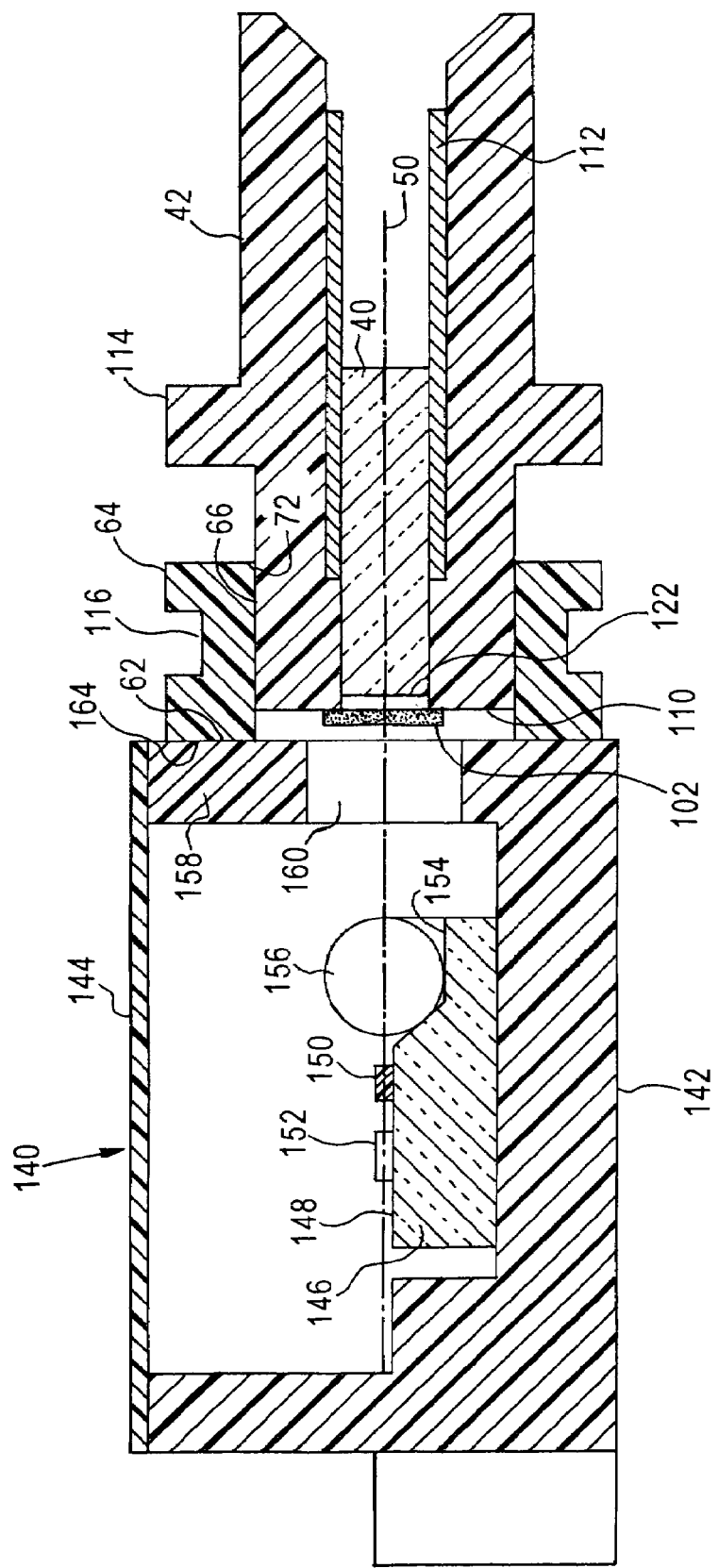
FIG. 6 is a side view of a planar TOSA wherein a polarizer is fixedly attached to a receptacle assembly for a fiber stub and is spaced from an end face of the fiber stub by an air gap.

Reference is now made to FIG. 6 of the drawing wherein the planar TOSA package 140 of FIG. 5 is combined with the receptacle assembly 42, collar 64 and polarizer 120 of FIG. 3. In FIG. 6, the polarizer 120 is permanently fixedly attached to the end face 110 of the receptacle assembly 42 and the air gap 122 is provided between opposed faces of the polarizer 120 and the fiber optic stub 40. The structure illustrated in FIG. 6 can be modified to eliminate the air gap, by positioning the end face 100 of the fiber optic stub 40 against the polarizer 120.

In the embodiments of FIGS. 5 and 6, the end face 164 of the wall 158, between the base 142 and ceiling 144 of the planar TOSA package 140, abuts the end face 62 of the collar 64. The end face 62 of the collar 64 is moved in the x and y directions to satisfy the x and y parameters. Then, the receptacle assembly 42 is translated in the z axis direction, i.e., in the general direction of beam propagation, to control the z axis parameters. Then, the desired power density incident on the end face 100 of the optical fiber stub 40 is attained by rotating the receptacle assembly 42 relative to the collar 64. When all of the required x, y, z and power parameters have been satisfied, the opposing surfaces are permanently bonded to each other.

Reference is now made to FIGS. 7, 8 and 9, respectively, an elevation interior view, a top interior view and an end interior view at right angles to the views of FIGS. 7 and 8 of a TOSA 170 with a butt coupled design. The TOSA 170 of FIGS. 7-9 includes a package 172 shaped as a right parallelepiped and including an optical bench 174 having a planar floor fixedly mounted on the base 176 of the package 172. The optical bench 174 carries semiconductor laser 177 for emitting a linearly polarized coherent optical beam.

Bench 174 includes a longitudinally extending v-groove 178 (FIG. 8) generally aligned with the longitudinal (z) axis 187 of the package 172. Fiber holder/polarizer assembly 180 having a cylindrical outer surface 182 is fixedly mounted in V-groove 178. An end face 184 of the fiber holder/polarizer assembly 180 in proximity to the optical output of the laser 177 carries a linear polarizer 186 that intercepts the optical beam the laser emits. The fiber holder 180 includes an elongated bore (not shown) that extends in the direction of the z axis 187 of package 172 and in which an optical fiber 188 is fixedly mounted. The optical fiber 188 has a planar input end face (not shown) that abuts polarizer 186 and lies in the same plane as end face 184 of holder 180. Fiber 188 extends through a substantial length beyond the end face 189 of the holder 180 that is remote from the end face 184 that carries the polarizer 186. The optical fiber extends beyond end face 189 into a connector assembly 190 fixedly mounted on the end wall 192 of the package 172 opposite from the end wall 194 where the optical bench 174 is located. The fiber holder 180 is sufficiently long to assure the spatial stability of the optical fiber 188 even though the optical fiber is suspended between the holder 180 and the connector assembly 190.

The shape and position of the beam from laser 177, as incident on the input end face of optical fiber 188, are controlled by moving the fiber holder 180 in the V groove 178, in a plane at right angles to the longitudinal (z) axis 187 of package 172 that is coincident or approximately coincident with the longitudinal axis of the optical fiber 188. The size of the beam incident on the input end face of fiber 188 is controlled by moving the fiber holder 180 back and forth in the V groove 178 in the direction of the z axis of package 170. The power density incident on the input end face of the optical fiber is controlled by turning the fiber holder 180 about the z axis 187.

Optical bench 174 and the components thereon correspond to segment 11 of FIG. 1, while fiber holder/polarizer assembly 180 and the components thereon correspond to segment 23 of FIG. 1. Prior to locating assembly 180 in V groove 178 on bench 174, all components of the bench 174 and the assembly 180 are permanently fixedly connected in place. After the cylindrical outer surface 182 of assembly 180 has been positioned opposite to surfaces of V groove 178 such that the beam from laser 177, as incident on the input end face of fiber 188, has the correct position, size, shape and power density, the opposed surfaces of V groove 178 and assembly 180 are permanently fixedly connected to each other.

Reference is now made to FIG. 10 of the drawing wherein the lens based TO body 44 of FIG. 2 is combined with a modified receptacle assembly 200 to form housing 201. Assembly 200 includes a sleeve 202 that extends from the end face of the receptacle assembly 200 parallel to the axis 50 of the TO body 44. Sleeve 202 has cylindrical interior wall 204 that is concentric with the longitudinal axis of assembly 200 and is therefore approximately concentric with the longitudinal axis 50 of TO body 44 that is also the longitudinal axis of housing 201. The end faces 206 and 208 of the receptacle assembly 200 and the TO body 44 (that are perpendicular to longitudinal axis of the housing 201) are longitudinally spaced from each other to enable the TO body 44 to be moved longitudinally with respect to the receptacle assembly 200. The inner diameter of the cylindrical wall 204 of sleeve 202 of the receptacle assembly 200 is slightly greater than the outer diameter of the cylindrical wall 46 of TO body 44 to enable the receptacle assembly 200 to be (1) moved in the planes perpendicular to longitudinal (z) axis 50 of housing 201, (2) moved in the z axis direction and (3) turned about the z axis.

A fixture of the type used in connection with the manufacture of the devices illustrated in FIGS. 2-5 holds the TO body 44 and the receptacle assembly 200. The fixture permits movement of the TO body 44 and the receptacle assembly 200 relative to each other in the directions of the x, y and z axes of the housing including assembly 200 and body 44 to control the size, shape and numerical aperture of the optical energy incident on the end face of optical fiber stub 40. The fixture enables the receptacle assembly 200 to be turned about its longitudinal axis to control the power density of the optical energy from the laser incident on the end face of optical fiber stub 40. After the TO body 44 and the receptacle assembly have been positioned to attain these desired parameters, epoxy 210 is inserted in the gap between the facing, i.e., opposing, outer cylindrical wall 46 of the TOSA body 44 and the inner cylindrical wall 204 of the sleeve 202 of the receptacle assembly 200. The arrangement of FIG. 10 has the advantage of enabling the TOSA body 44 and the receptacle assembly 200 to be aligned in the x, y and z axis directions in one step, that is followed by turning of the receptacle assembly 200 with respect to the z axis of housing 201, to achieve desired output power.

In each of the embodiments of FIGS. 1-10, the end face of the fiber optic element is at right angles to the axis of the optical source. However, this is not necessarily the case, as indicated by the optical schematic diagram of FIG. 11, wherein the input end face 220 of the optical fiber element 222, that carries linear polarizer 223, is removed from the optical beam axis 224 of laser 226 (that emits a linearly polarized optical beam) by an angle that theoretically can have any value between 0° and 90°. However, for practical applications, the angle between the laser beam axis 222 and the input end face 220 of the optical fiber element 222 is less than 10° or 15° because larger angles adversely affect the optical coupling efficiency of the laser beam energy to the output end of the fiber optic element 222. The angle between the laser beam axis 224 and the input end face 220 of the fiber optic element 222 on which the beam from the laser 226 is incident assists in determining the power density, spot size and shape of the beam incident on the fiber optic element end face.

Figure 11:
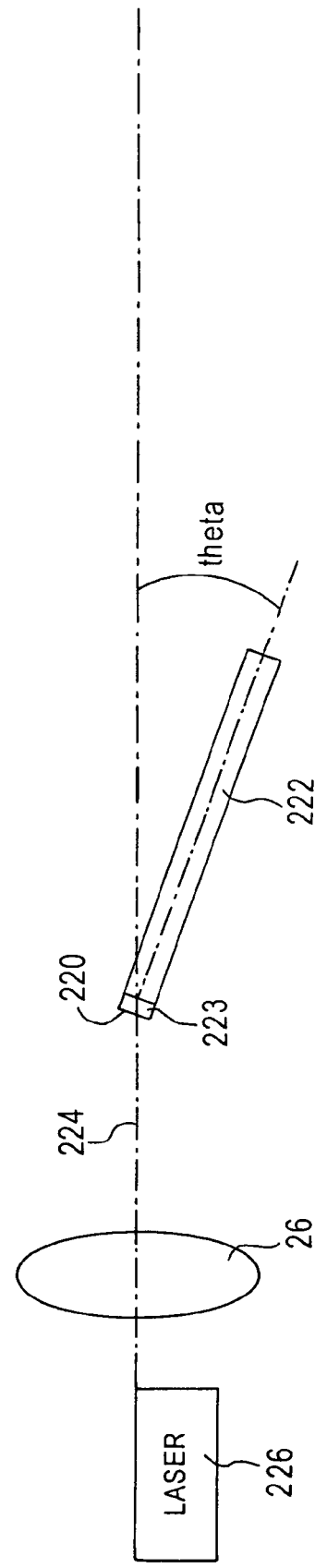
FIG. 11 is a schematic diagram of a TOSA including a fiber optic element having an input end face that is titled (away from 90°) with respect to the optical axis of an optical beam emitted by a semiconductor laser.

In manufacture, the optical fiber element 222 illustrated in FIG. 11 is positioned in a holder, such as the fiber holder/polarizer assembly 180 of FIGS. 7-9, or the receptacle assemblies 42 of FIGS. 2-6, or the assembly 200 of FIG. 10. Then the holder for optical fiber element 222 is moved in the x, y and z directions to obtain desired spot size, shape and position. After the end face of the fiber optic element 222 illustrated in FIG. 11 is correctly positioned, the holder for element 222 is turned about the longitudinal axis of the housing including laser 226 and the fiber holder to control the power density incident on the end face 220 of the fiber optic element 222.

While there have been described and illustrated specific embodiments of the invention, it will be clear that variations in the details of the embodiment specifically illustrated and described may be made without departing from the true spirit and scope of the invention as defined in the appended claims.

The invention claimed is:

1. A device comprising:
a housing having a longitudinal axis (z) and a pair of axes (x, y) at right angles to each other in a plane perpendicular to the z axis, the housing including first and second segments having opposed surfaces that are fixedly arranged with respect to the other by a collar, the opposed surfaces separate from each other and substantially orthogonal to the longitudinal axis, the collar contacting an end surface of the first segment that is substantially orthogonal to the longitudinal axis of the housing and contacting a surface of the second segment such that contacting surfaces of the collar and second segment are substantially parallel to the longitudinal axis of the housing;
the first segment fixedly carrying an optical bench having an upper surface upon which a circuit for energizing a semiconductor optical source for emitting a linearly polarized optical beam in the general direction of the z axis is mounted, the optical bench having a cutout upon which a focusing element is mounted, the opposed surface of the first segment adjacent to an end surface of the collar;
the second segment fixedly carrying (a) an optical fiber element having an end face positioned along the z axis to intercept the optical beam, and (b) a linear optical polarizer positioned between the optical source and the end face;

the first and second segments being fixedly positioned relative to each other along the x, y and z axes for causing the optical beam, as incident on the end face, to have a predetermined geometry and position; and the second segment being fixedly positioned about the z axis for causing the optical beam, as incident on the end face, to be in a predetermined power range.

2. The device of claim 1 the focusing element being positioned to intercept the optical beam, the first and second segments being positioned relative to each other along the directions of the x, y and z axes so the focusing element can focus the beam on the end face with a predetermined numerical aperture and assist in causing the beam to have the predetermined geometry and position.

3. The device of claim 2 wherein the beam geometry includes spot size and spot shape.

4. The device of claim 2 wherein the focusing element includes a lens having a center that is displaced from the beam axis.

5. The device of claim 1 wherein the end face of the fiber element is perpendicular to the z axis.

6. The device of claim 1 wherein the second segment includes a receptacle carrying the fiber optic element, the collar and receptacle having opposed cylindrical surfaces that are fixedly connected to each other.

7. The device of claim 1 wherein the first and second segments have cylindrical outer surfaces that are substantially coaxial with the z axis.

8. The device of claim 1 wherein the semiconductor optical source is a laser for emitting the linearly polarized beam.

9. The device of claim 1 wherein the semiconductor optical source is of a type for emitting a non-polarized beam, and the source includes a linear polarizer for linearly polarizing the non-polarized beam.

10. The device of claim 1 wherein the polarizer is mounted on the end face of the optical fiber element.

* * * * *

UNITED STATES PATENT AND TRADEMARK OFFICE
CERTIFICATE OF CORRECTION

| | | |
|---|---|---|
| PATENT NO. | : 7,549,804 B2 | Page 1 of 1 |
| APPLICATION NO. | : 11/153545 | |
| DATED | : June 23, 2009 | |
| INVENTOR(S) | : David Healy | |

It is certified that error appears in the above-identified patent and that said Letters Patent is hereby corrected as shown below:

Column 15, Line 8, Claim 2, after "claim 1" insert --wherein--.

Signed and Sealed this
Second Day of October, 2012

David J. Kappos
*Director of the United States Patent and Trademark Office*